United States Patent
Thomsen et al.

(10) Patent No.: US 6,584,304 B1
(45) Date of Patent: Jun. 24, 2003

(54) SWITCHABLE WIDE BAND RECEIVER FRONT END FOR A MULTIBAND RECEIVER

(75) Inventors: Pia Thomsen, Aabybro (DK); Niels Ole Norholm, Aalborg (DK)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/404,072

(22) Filed: Sep. 23, 1999

(30) Foreign Application Priority Data

Nov. 30, 1998 (EP) .............................................. 98122736

(51) Int. Cl.$^7$ .............................. H04B 1/18; H04M 1/00

(52) U.S. Cl. ...................... 455/188.1; 455/552; 455/307

(58) Field of Search ................................. 455/552, 553, 455/550, 188.1, 189.1, 191.3, 307, 306, 304, 302, 317, 254, 266, 285; 375/316; 370/343

(56) References Cited

U.S. PATENT DOCUMENTS

| | | | | |
|---|---|---|---|---|
| 5,694,414 A | * | 12/1997 | Smith et al. ................. | 375/200 |
| 5,901,349 A | * | 5/1999 | Guegnaud et al. .......... | 455/304 |
| 5,924,019 A | * | 7/1999 | McDonald et al. ........... | 455/83 |
| 6,069,923 A | * | 5/2000 | Ostman et al. .............. | 375/316 |
| 6,075,996 A | * | 6/2000 | Srinivas ...................... | 455/552 |
| 6,112,059 A | * | 8/2000 | Schwent et al. ............ | 455/67.1 |

OTHER PUBLICATIONS

Newton's Telecom Dictionary, 15th edition, ©1999, p. 278: DUPLEXER.*

* cited by examiner

Primary Examiner—Vivian Chin
Assistant Examiner—Eliseo Ramos-Feliciano
(74) Attorney, Agent, or Firm—Michael J. Striker (57) ABSTRACT

The present invention provides a switchable wide band receiver front end device for a multiband receiver which includes a broadcast signal receiver (1) for receiving broadcast signals within multiple receiving frequency bands, which are divided into channels; a wideband low noise amplifier (2) connected to the broadcast signal receiver (1) for amplifying the broadcast signals of all frequency bands and for outputting amplified output signals which are branched to multiple switches (11, 12, 13) of a switching device (10), wherein the number of switches (11, 12, 13) corresponds to a total number of receiving frequency bands; multiple filters (22, 23, 24) each connected to a respective switch (11, 12, 13), wherein each filter passes all signals within an associated receiving frequency band; a mixer (30) connected to the output side of each filter for mixing the filtered signals with a locally generated mixing signal from a frequency synthesizer to produce intermediate frequency signals; and a controller (14) for outputting a first control signal to the switching device (10) for switching on one of the switches, whereby one of the multiple receiving frequency bands is selected, and for outputting a second control signal to the frequency synthesizer (31) to generate a mixing signal corresponding to the selected receiving frequency band.

16 Claims, 9 Drawing Sheets

| GSM system | RX frequency [MHz] | chosen local oscillation LO | local oscillation frequency [MHz] | phase shifter 62 | phase shifter 55 | side band |
|---|---|---|---|---|---|---|
| GSM 900 | 935-960 | upper ($LO_{12}$) | 1335-1360 | 0° | 90° | LSB |
| GSM 1800 | 1805-1880 | lower ($LO_{21}$) | 1405-1480 | 90° | 0° | USB |
| GSM 1900 | 1930-1990 | lower ($LO_{31}$) | 1530-1590 | 90° | 0° | USB |

FIG. 9
Table

| signal | A | B | C | D | E | |
|---|---|---|---|---|---|---|
| received broadcast signal | -98dBm | -78dBm | -83dBm | -80dBm | -85dBm | using a normal mixer |
| noise signal | -43dBm | -23dBm | -93dBm | -90dBm | -95dBm | |
| received broadcast signal | -98dBm | -78dBm | -83dBm | -80dBm | -85dBm | using an image reject mixer |
| received noise signal | -43dBm | -23dBm | -73dBm | -90dBm | -95dBm | |

FIG. 11

SWITCHABLE WIDE BAND RECEIVER FRONT END FOR A MULTIBAND RECEIVER

BACKGROUND OF THE INVENTION

1. Field of the Invention

The present invention relates to a switchable wide band receiver front end or front end device for a multiband receiver.

2. Prior Art

Although applicable to any digital, mobile system, the present invention and its underlined problems will be discussed with particular reference to GSM mobile systems.

In general, GSM is designed as an international digital cellular service. Originally, the 900-MHz band was reserved for GSM services, wherein the frequency band from 890 to 915 MHz is reserved for the uplink and the frequency band from 935 to 960 MHz is reserved for the downlink, i.e. sending data from a base station to a mobile station.

Since GSM first entered commercial service in 1992, it has been adapted to work at 1800 MHz for the Personal Communications Networks PCN in Europe and at 1900 MHz for Personal Communications System PCS in the United States. Accordingly, there exist three main GSM systems operating at three different receiving frequency band. Therefore, a mobile station including a wide band receiver front end has to be switchable between the different receiving frequency bands to be operable in different areas having different GSM standards.

Figure 1:
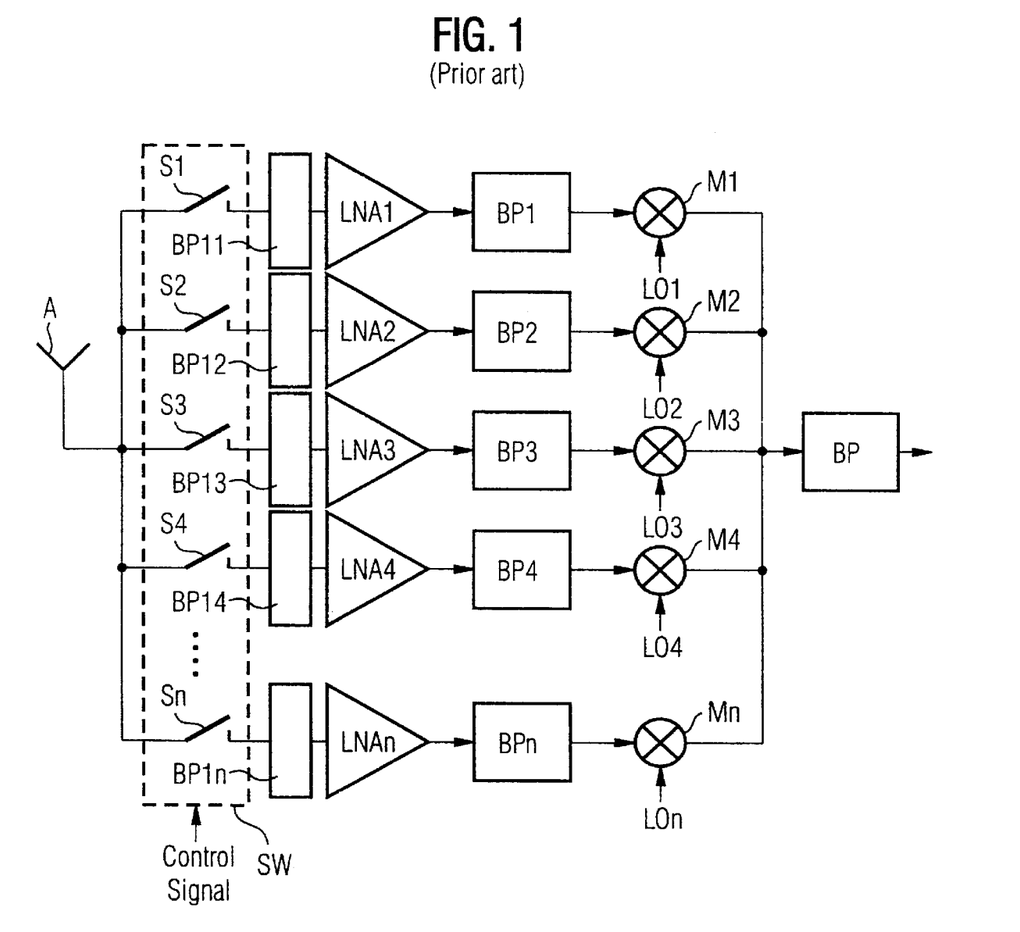
FIG. 1 is a block diagram of a conventional receiver front end comprising a plurality of low noise amplifiers and a plurality of mixers.

FIG. 1 shows a conventional receiver front end for switching between multiple receiving frequency bands RX1 to RXn using a switching means SW which is connected on its input side to an antenna A. The switching means SW of this conventional receiver front end comprises multiple switches S1 to Sn, wherein the number of those switches corresponds to the number of receiving frequency bands RX1 to RXn. Each of the switches S1 to Sn is connected to a narrow band LNA which amplifies the received signal within the predetermined receiving frequency band via a respective bandpass filter BP11 to BP1n. Each of the multiple narrow band low noise amplifiers LNA1 to LNAn is connected on its output side to bandpass filters BP1 to BPn which suppress all signals outside of the corresponding receiving frequency band. Each of the filtered output signals is mixed with a corresponding locally generated mixing signal LO1 to LOn from a frequency synthesizer by multiplication within an associated mixer M1 to Mn and passed to a further narrow-banded bandpass filter BP having a bandpass frequency characteristic to pass only the signal which has a frequency in the range of the chosen physical channel. Accordingly, in a GSM system, the bandwidth of the narrow bandpass filter BP is approximately 200 kHz.

As can be seen from FIG. 1, a conventional receiver front end comprises multiple low noise amplifiers LNA1 to LNAn and multiple mixers M1 to Mn, wherein the number of the low noise amplifiers and the mixers corresponds to the number of different receiving frequency bands which have to be received by the mobile station. For instance, within a mobile station designed to receive a broadcast signal in the downlink frequency bands of GSM 900, GSM 1800 and GSM 1900, three different low noise amplifiers and three different mixers have to be employed. This has the drawback that many components have to be integrated within a mobile station, thus increasing its total production cost and making a further miniaturization difficult.

It is therefore desired to provide a wide band receiver front end for a multiband receiver which is able to switch between multiple receiving frequency bands, but uses a minimum number of different components, thus lowering the production costs and facilitating a miniaturization of the mobile phone.

SUMMARY OF THE INVENTION

The invention provides a switchable wide band receiver front end device for a multiband receiver having the features of claim 1.

Particularly, the switchable wide band receiver front end device for a multiband receiver according to the present invention comprises:

- a broadcast signal receiving means for receiving broadcast signals within multiple receiving frequency bands, wherein each frequency band is divided into a plurality of channels,
- a wide band low noise amplifier connected to said broadcast signal receiving means for amplifying the broadcast signals of all receiving frequency bands outputting an amplified output signal which is branched to multiple switches of a switching means, wherein the number of said switches corresponds to the number of receiving frequency bands,
- multiple filters each connected to one of said switches, wherein each filter has a bandpass filtering characteristic to pass all signals within an associated receiving frequency band,
- a mixing means connected to the output side of each filter mixing the filtered signal with a locally generated mixing signal from a frequency synthesizer to produce an intermediate frequency signal, and
- a control means outputting a first control signal to said switching means for switching on one of said switches wherein one of said multiple receiving frequency bands is selected and outputting a second control signal to said frequency synthesizer to generate a mixing signal corresponding to the selected receiving frequency band.

In a preferred embodiment of the present invention, a mixing means is an image rejection mixer.

This has the particular advantage that the requirements with respect to the filters are not so high, i.e. the suppression or attenuation of undesired signal components, in particular at the image frequency performed by the filters, does not need to be as high as in the case of using a normal mixing means. Accordingly, a lower number of in-series-connected filters or more simple filters can be used, thus reducing further the production cost and facilitating the miniaturization of the mobile phone.

The principle idea of the present invention resides in using a wide band low noise amplifier which amplifies the broadcast signals of all desired receiving frequency bands and to substitute the plurality of mixers within a conventional receiver front end by only one mixer.

Further preferred embodiments of the invention are listed in the dependent claims.

According to a preferred embodiment, the output side of the mixing means is an IF-filter provided having a filtering characteristic to pass all signals within a narrow frequency band around a predetermined intermediate frequency.

According to a further preferred embodiment, the wide band receiver front end comprises a further switching means having multiple switches each connected to the output side of a filter, wherein said switching means is provided on the input side of said mixing means for inhibiting interactions between the filters.

Providing such a further switching means has the particular advantage that interactions between the different filters which are caused by the direct connection are suppressed.

According to a further preferred embodiment, the mixer is an image reject mixer, wherein on the input side of said image reject mixer, the received signal is branched to a first signal branch and a second signal branch each comprising a normal mixer, wherein the input signal is mixed in the first signal branch with said locally generated mixing signal which is phase-shifted by a first phase-shifting means to produce a first mixing product signal which in turn is phase-shifted by a second phase-shifting means and wherein the input signal is mixed in the second signal branch with said locally generated mixing signal directly to produce a second mixing product signal which is added on the output side of said image rejection mixer to said phase-shifted first mixing product signal to produce said intermediate-frequency signal.

According to a first preferred embodiment, the first and second phase-shifting means of the image reject mixer each performs a phase-shift of 90°.

According to a further preferred embodiment, the switching means is a high power antenna microwave monolithic integrated circuit having multiple receiving faults and a switching speed of about 100 ns.

According to a further preferred embodiment, the receiving frequency bands are downlink frequency bands of a GSM telecommunication system.

According to a further preferred embodiment, the wide band receiver front end is capable of receiving three different frequency bands, wherein the first receiving frequency band is the downlink frequency band of GSM 900, the second receiving frequency band is the downlink frequency band of GSM 1800 and the third receiving frequency band is the downlink frequency band of GSM 1900.

According to a further preferred embodiment, the IF-filter has a narrow frequency passband of 200 KHz corresponding to a frequency width of a physical GSM channel.

According to a further preferred embodiment, the control means detects automatically on which receiving frequency band data is broadcast from a transmitting base station and generates said first control signal such that this receiving frequency band is selected.

According to a further preferred embodiment, the filters are selected from a group consisting of surface acoustic wave filters and dielectric filters. In principle, all kinds of filters are possible, such as helical filters, multilayer filters, etc.

According to a further preferred embodiment, said wide band low noise amplifier amplifies the received broadcast signal within a wide frequency band which includes more than one of the desired multiple receiving frequency bands.

According to a further preferred embodiment, said wide frequency band of said wide band low noise amplifier includes the downlink frequency bands of. GSM 900, GSM 1800 and GSM 1900.

According to a further preferred embodiment, said wide band frequency band ranges from 100 MHz to 2000 MHz.

According to a further preferred embodiment, the locally generated mixing signals are chosen such that the frequency difference between said mixing signals is minimal.

According to a further preferred embodiment, the frequency of the intermediate frequency signal which is output by said mixing means is 400 MHz.

According to a further preferred embodiment, the signal noise components at the image frequency are suppressed.

According to a further preferred embodiment, the low noise amplifier only covers two or more frequency bands.

According to a further preferred embodiment, the switches and the filters are placed between the antenna and the low noise amplifier.

According to a further preferred embodiment, at least some of the switches are replaced by matching circuits.

According to a further preferred embodiment, more narrow banded filters are provided for filtering one or more of the frequency bands, instead of one filter covering the entire receiving band, preferably the GSM 1800 is split into two filters, the first covering the band from 1805 to 1845 MHz and the second covering the band from 1845 to 1880 MHz.

BRIEF DESCRIPTION OF THE DRAWINGS

The present invention will become more fully understood by the following detailed description of preferred embodiments thereof in conjunction with the accompanying drawings, in which.

DESCRIPTION OF THE PREFERRED EMBODIMENTS

Figure 2:
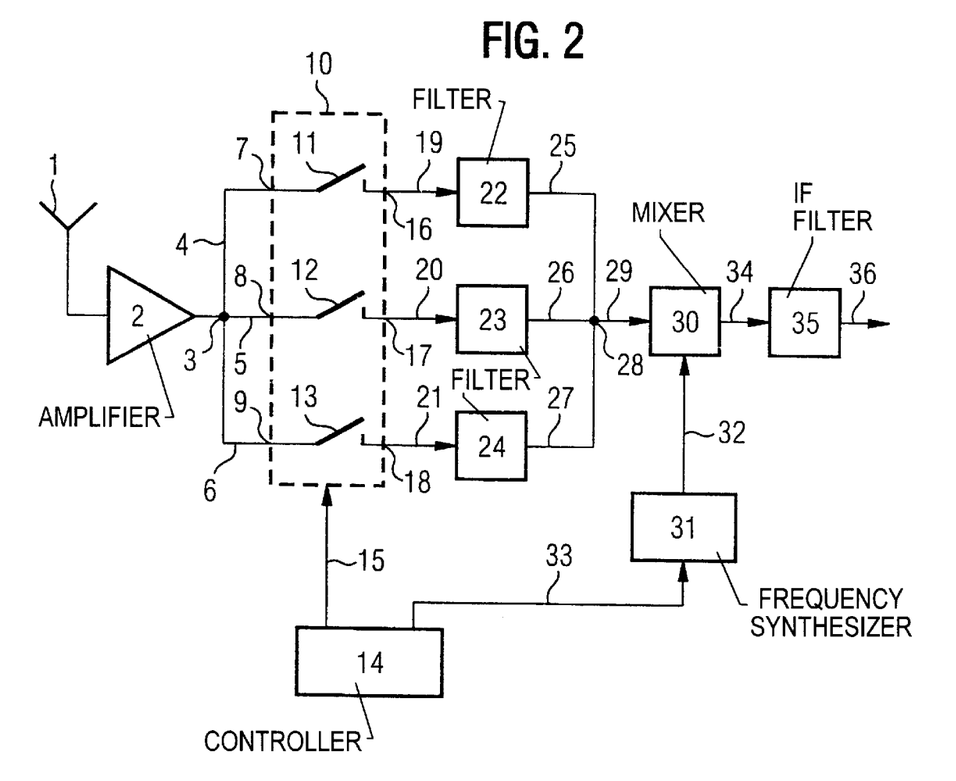
FIG. 2 is a block diagram of a first embodiment of the switchable wide band receiver front end according to the present invention.

FIG. 2 shows a first embodiment of the switchable wide band receiver front end according to the present invention. An antenna 1 is used for receiving broadcast signals broadcast from a base station. The broadcast signal receiving means 1 is connected to a wide band low noise amplifier 2. The wide band low noise amplifier 2 amplifies the received broadcast signals of all desired receiving frequency bands.

In the embodiment shown in FIG. 2, the switchable wide band receiver front end of the mobile phone is designed to three receiving frequency bands, i.e. the downlink frequency bands of the three different GSM standards which are 935 to 960 MHz for GSM 900, 1805 to 1880 for GSM 1800 and 1930 to 1990 MHz for GSM 1900. Accordingly, the wide band low noise amplifier 2 according to the present invention amplifies any signal Within a wide frequency band ranging preferably from 900 MHz to 2000 MHz. The received broadcast signal is amplified by the wide band low noise amplifier with a gain of e.g. 15 to 20 dB.

The amplified received signal is branched at node 3 into three different input lines 4, 5, 6 which are connected to input ports 7, 8, 9 of switching means 10 comprising at least three different switches 11, 12, 13. Switches 11, 12, 13 can be switched independently from each other in response to a control signal which is output from a control unit 14 via a control line 15 to the switching means 10. The switches 11, 12, 13 connect the input ports 7, 8, 9 respectively to output ports 16, 17, 18 of the switching means 10. The output ports 16, 17, 18 of the switching means 10 are respectively connected via lines 19, 20, 21 to filtering devices 22, 23, 24. The filters 22, 23, 24 are bandpass filters and have a filtering characteristic to pass signals within the predetermined receiving frequency band.

Bandpass filter 22 e.g. has a filtering characteristic to pass signals within a downlink receiving frequency band of GSM 900, i.e. 935 to 960 MHz, bandpass filter 23 has the filtering characteristic to pass signals in the downlink receiving frequency band of GSM 1800, i.e. 1805 to 1880 MHz, and bandpass filter 24 has a filtering characteristic to pass signals in the downlink receiving frequency band of GSM 1900, i.e. 1930 to 1990 MHz. In preferred embodiments, the bandpass filters 22, 23, 24 are surface acoustic wave filters or dielectric filters. The signals filtered by bandpass filters 22, 23, 24 are output via lines 25, 26, 27 to a common node 28 and from there via line 29 to the input of a mixing means 30 mixing the filtered signal with a locally generated mixing signal received from a frequency synthesizer 31 via line 32. The frequency synthesizer is controlled by the control unit 14 via a control line 33 and generates different local oscillation frequencies to be mixed with the filtered signal according to a control signal sent by the control unit 14.

According to a preferred embodiment, the control unit 14 detects automatically on which receiving frequency band data is broadcast from a transmitting base station to the mobile station which includes the wide band receiver front end according to the present invention and generates a first and second control signal, wherein the first control signal is sent to the switching means 10 via the control line 15 and the second control signal is sent to the frequency synthesizer 31 via the control line 33.

The first control signal controls the switching means 10 such that the switch which corresponds to the detected GSM receiving frequency band is switched on and the remaining switches are switched off. If, for instance, the control unit 14 receives a detecting signal indicating that the broadcast signals are broadcast within the downlink receiving frequency band of GSM 900, i.e. 935 to 960 MHz, switch 11 of switching means 10 is switched on, connecting line 4 and line 19, whereas switches 12, 13 of switching means 10 are switched off, thus interrupting lines 5, 20 and lines 6, 21. The received broadcast signal accordingly is filtered by the bandpass filter 22 and reaches mixer 30 via lines 25, 29. The control unit 14 further generates a second control signal which causes the frequency synthesizer 31 to generate a local oscillation within the local oscillation frequency range of GSM 900, i.e. 1335 to 1360 MHz according to the selected broadcast channel having respectively a channel width of 200 KHz. The second control signal which the frequency synthesizer 31 receives via line 33 from control unit 14 contains information with respect to the channel chosen from the 124 broadcast channels of GSM 900 and the frequency synthesizer generates the corresponding local oscillation frequency and supplies this mixing signal to mixer 30.

The mixer 30 mixes the filtered broadcast signal input via line 29 with the locally generated mixing signal supplied from the frequency synthesizer 31 via line 32 by multiplying both signals. The multiplication of the two signals by means of mixer 30 in the time domain corresponds to a convolution of the signals in the frequency domain. Accordingly, the mixing means 30 produces an output signal at a predetermined intermediate frequency IF which may be, for instance, 400 MHz. The generated mixing signal is output by mixing means 30 via line 34 to an IF-filter 35 which has a narrow frequency passband of 200 KHz corresponding to the frequency width of physical GSM data channel. From the IF-filter 35, the signal is output via line 36 for further processing within the mobile phone.

Figure 3:
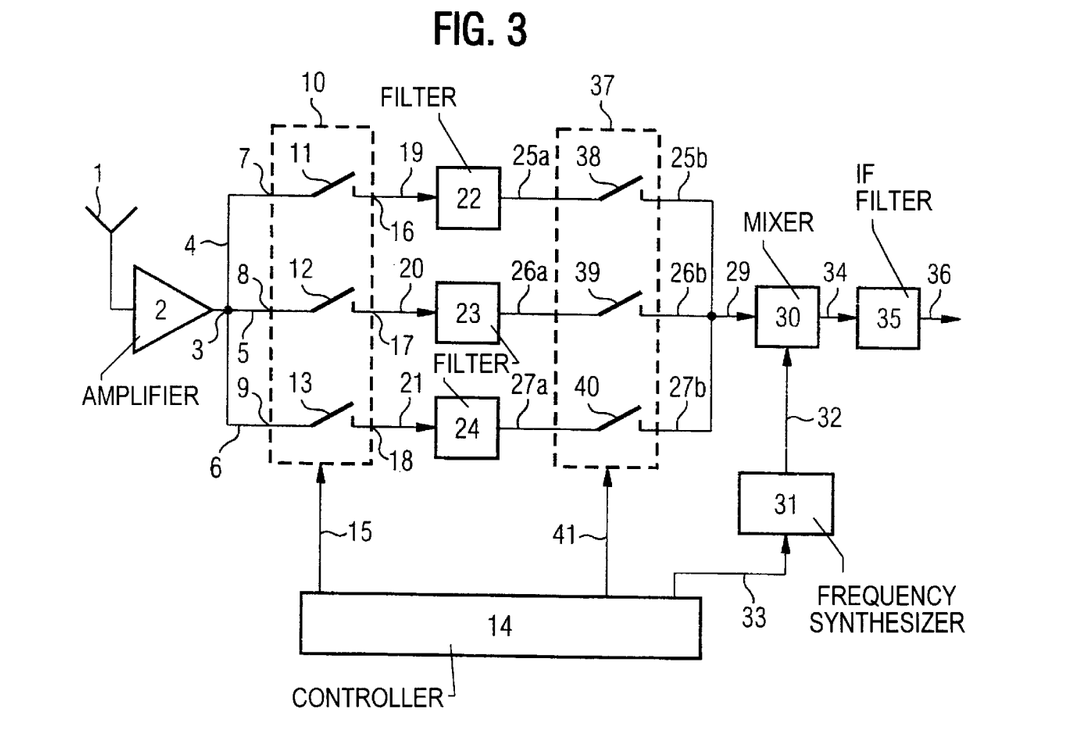
FIG. 3 is a block diagram of a second embodiment of a switchable wide band receiver front end according to the present invention.

FIG. 3 shows a second embodiment of a wide band receiver front end according to the present invention. In the embodiment shown in FIG. 3, a further switching means 37 is provided similar to the switching means 10. The second switching means 37 comprises at least three different switches 38, 39, 40 which are controlled independently from each other via a control line 41 which connects the switching means 37 to the control unit 14. Switching means 10, 37 are controlled by the control unit 14 via control lines 15, 41 in such a manner that the switches 11, 38, the switches 12, 39 and the switches 13, 40 connected in series to a corresponding bandpass filter 22, 23, 24 are always switched at the same time. If, for instance, switch 11 of switching means 10 is closed, also switch 38 of switching means 37 will be closed. The function of the second switching means 37 resides in that the different filters 22, 23, 24 are also on its respective output side completely separated from each other, thus inhibiting any interactions between the filters which could affect the filter characteristics of one of the bandpass filters.

Figure 4A:
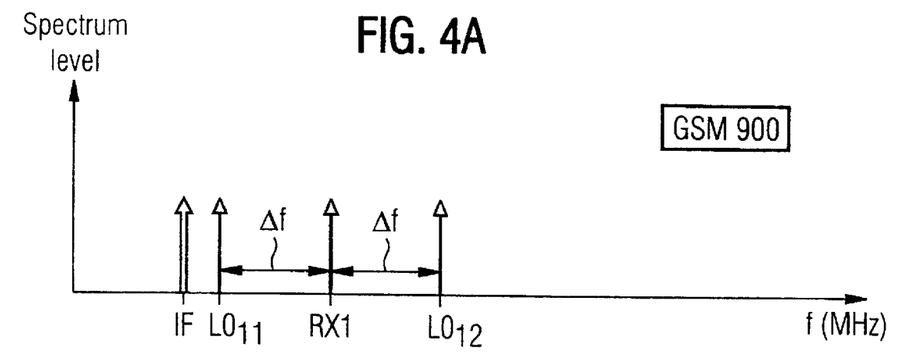
FIG. 4A to 4C is a diagram showing the spectrum levels of the different GSM-systems.
Figure 4B:
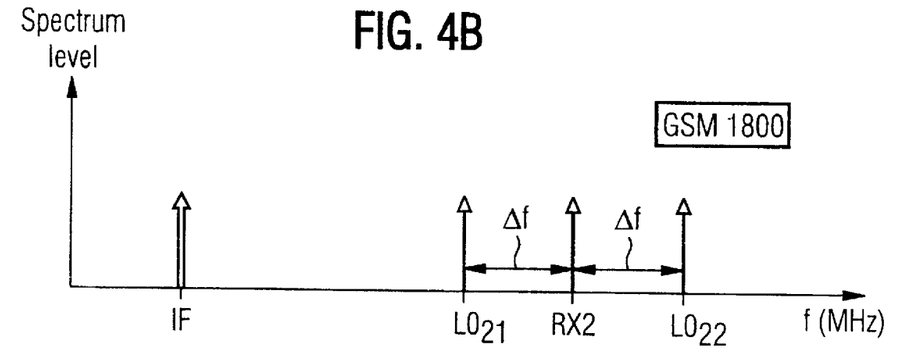
Figure 4C:
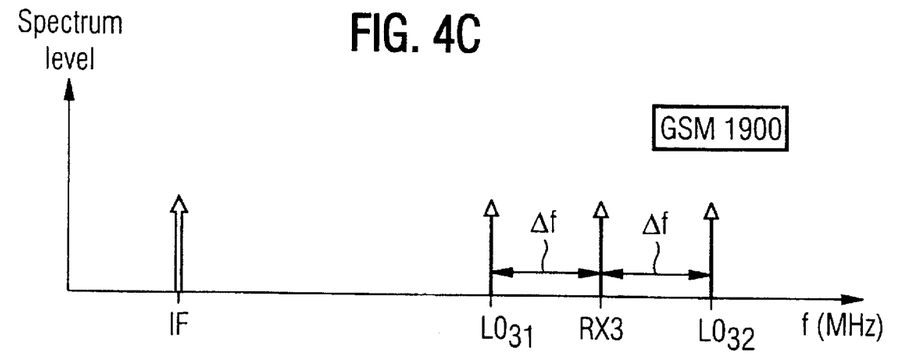

FIG. 4 shows the different spectrum levels for the three different GSM systems.

FIG. 4A shows a spectrum level for GSM 900. A received broadcast signal having a frequency RX1 within the receiving frequency band for GSM 900 which is 935 to 960 MHz might be mixed with a lower local oscillation LO11 or an upper local oscillation LO12 by multiplication to produce a mixed output signal at an intermediate frequency IF. The frequency difference between the local oscillation frequencies LO11 or LO12 and the receiving frequency RX1 is the same as the intermediate frequency IF. In case that the intermediate frequency is chosen to be 400 MHz and the received broadcast signal is transmitted at a frequency of 935 MHz, the lower local oscillation frequency LO11 has a frequency of 535 MHz and the upper local oscillation frequency LO12 has a frequency of 1335 MHz. For mixing the received broadcast signal at a frequency RX1 to a mixing product signal at a frequency of IF, one can choose either the upper or the lower oscillation frequency.

FIG. 4B shows the spectrum level for GSM 1800 having a receiving frequency RX2 higher than the receiving frequency RX1 of GSM 900. The receiving frequency RX2 is within the receiving frequency band of GSM 1800, i.e. in between 1805 and 1880 MHz. The frequency difference between the lower local oscillation frequency LO21 and the receiving frequency RX2 corresponds to the intermediate frequency IF, e.g. 400 MHz. If the receiving frequency RX2 is, for example, 1805 MHz for the first channel within the receiving frequency band, the lower local oscillation LO21 has a frequency of 1405 MHz and the upper local oscillation has a frequency of 2205 MHz.

FIG. 4C shows the spectrum level for GSM 1900 wherein the receiving frequency RX3 is within a frequency range of 1930 to 1990 MHz. Like in FIG. 4A, 4B, the frequency difference between the local oscillation frequency LO31, LO32 and the receiving frequency RX3 is the same as the intermediate frequency of e.g. 400 MHz.

In the wide band receiver front end according to the present invention, the intermediate frequency IF is chosen in a frequency range of around 400 MHz which makes it possible to use local oscillation frequencies for the different GSM systems which are very close to each other. As already mentioned above, for mixing it does not matter whether one chooses the upper or the lower local oscillation frequency.

For GSM 900, the local oscillation frequency is chosen to be the upper local oscillation frequency LO12, whereas for GSM 1800 and GSM 1900, the local oscillation frequency is chosen to be the lower local oscillation frequency LO21 or LO31, respectively. As becomes evident from FIGS. 4A to 4C, LO12, LO21 and LO31 are very close to each other. If, for instance, RX1=935 MHz, RX2=1805 MHz and RX3= 1930 MHz, the corresponding local oscillation frequencies are 1335 MHz, 1405 MHz and 1530 MHz. By choosing the intermediate frequency to be around 400 MHz and by choosing the local oscillation frequency to be the upper or lower local oscillation frequency, it is possible to achieve local oscillation frequency for the different GSM standards which are very close to each other.

This provides a great advantage in the generation of the local oscillation frequency within the frequency synthesizer 31 of the wide band receiver front end according to the present invention. It is much easier to generate different local oscillation frequencies within a narrow band than within a wide frequency band.

Figure 5:
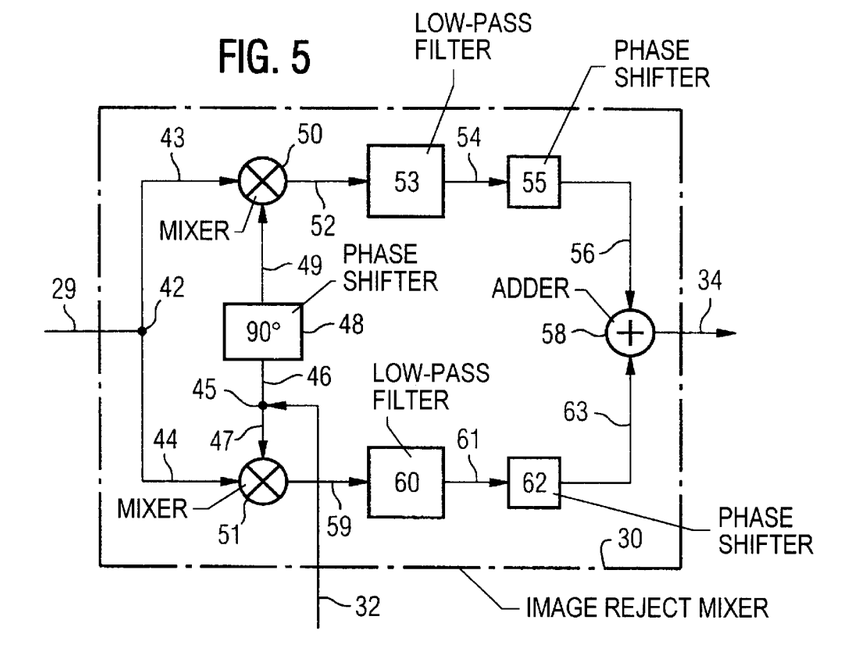
FIG. 5 is a block diagram of an image reject mixer employed in a preferred embodiment of the switchable wide band receiver front end according to the present invention.

Mixer 30 of the wide band receiver front end according to the present invention is in a first embodiment a normal mixer multiplying the input signals to produce an output signal. In a preferred embodiment, the mixer 30 is an image reject mixer the structure of which is shown in FIG. 5. The image reject mixer 30 as shown in FIG. 5 comprises a branching node 42 at the input side which branches the input signal line 29 into a line 43 and a line 44. The input line 32 through which the image reject mixer 30 receives the local oscillation frequency signal is branched at a branching node 45 to a line 46 and line 47. The input locally generated mixing signal coming from the frequency synthesizer 31 and branched off at node 45 via line 46 to a first phase-shifting means 48 is phase-shifted by 90° and supplied via line 49 to a first normal mixer 50. On the other hand, the input mixing signal received from the frequency synthesizer 31 via line 32 is branched off at node 45 via line 47 to a second mixer 51 without phase shifting.

The first mixer is connected via line 52 to a low-pass filter 53 which in turn is connected via line 54 to a second phase-shifting means 55 outputting a phase-shifted signal on line 56 to a summing means 58. In a similar manner, a second mixer 51 is connected via line 59 to a low-pass filter 60 which is in turn connected via line 61 to a third phase-shifting means 62 which outputs a phase shifted signal via line 63 to the summing means 58.

The first mixer 50 multiplying the input signal with the phase-shifted local oscillation frequency signal from the frequency synthesizer generates a quadrature mixer product signal Q, while the second mixer 51 generates an in-phase mixer product signal 1. The quadrature mixer product signal Q is supplied through the second phase-shifting means 55, the phase shift of which is controlled by the control unit to be either 90° or 0° depending on whether GSM 900 or GSM 1800/1900 is selected. The in-phase mixing product signal generated by the second mixer 51 is supplied to a third phase-shifting device 62, the phase-shift of which is controlled by the control unit to be either 0° or 90° depending on whether GSM 900 oder GSM 1800/1900 is selected as can be seen from the table in FIG. 6. After summing the in-phase and quadrature signals by summing means 58, the received signal combined constructively after passing through the image reject mixer 30 is translated to an IF frequency.

Figure 6:
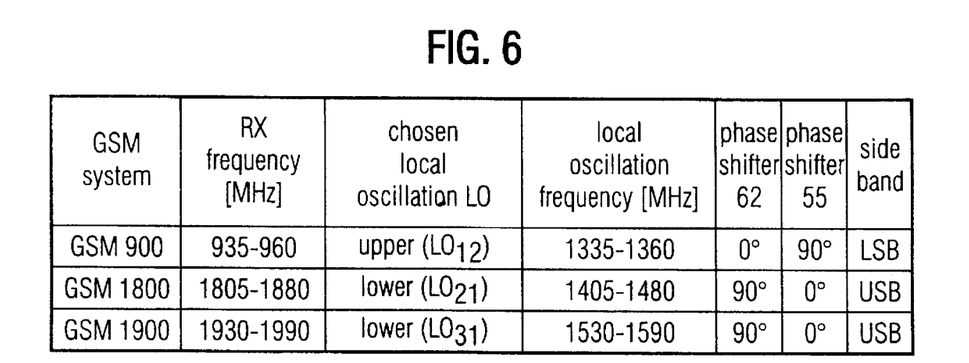
FIG. 6 is a table for the explanation of the different GSM systems.

The table shown in FIG. 6 shows the parameters used by the different GSM standards. If the mobile phone is switched to the GSM 900 operation mode having a downlink receiving frequency band between 935 and 960 MHz, the chosen local oscillation frequency signal is the upper local oscillation frequency within a frequency range of 1335 to 1360 MHz. The phase shifter 62 of the image reject mixer 30 shown in FIG. 5 is set by the control unit to perform a phase shift of 0°, whereas the phase shift 55 of the image reject mixer shown in FIG. 5 is set by the control unit to perform a phase shift of 90° using the lower side band of the signal.

In case that the mobile phone is switched to the GSM 1800 receiving mode having a downlink receiving band frequency range of 1805 to 1880 MHz, the chosen local oscillation frequency generated by the frequency synthesizer 31 is controlled by the control unit 14 via control line 33 to be the lower local oscillation frequency LO21, i.e. between 1405 and 1480 MHz depending from the selected broadcast channel. The phase shifter 62 of the image reject mixer 30 shown in FIG. 5 is set to 90° and the phase shifter 55 to 0° by the control unit 14 via not shown control lines. The upper side band of the signal is used.

In case that the mobile phone is switched to the GSM 1900 operation mode having a receiving frequency band ranging from 1930 to 1990 MHz, the local oscillation frequency is selected to be the lower oscillation frequency LO31 which is in the frequency range from 1530 MHz to 1590 MHz and the phase shifter 62 is simultaneously controlled to perform a phase shift of 90°, while the phase shifter 55 is controlled to perform a phase shift of 0°. Again, the upper side band of the signal is used.

Figure 7:
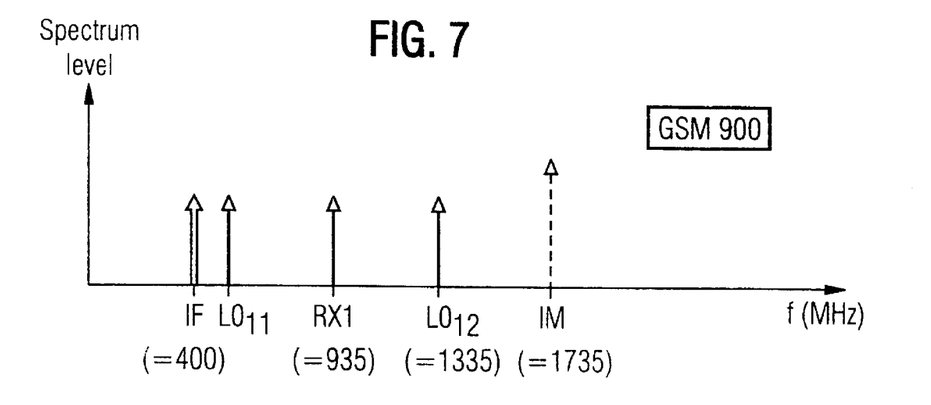
FIG. 7 is a diagram showing the spectrum level of a GSM 900 to explain the problems caused by noise signals at an image frequency.

FIG. 7 illustrates that an unwanted noise signal having a frequency at the image frequency IM might cause problems if not sufficiently suppressed. The image frequency or mirror frequency is the frequency which has the same frequency difference from the local oscillation frequency as the frequency of the received signal. In the example shown in FIG. 7, the receiving frequency might be 935 MHz and the chosen local oscillation frequency LO12 is 1335 MHz. If noise occurs at a frequency of 1735 MHz which is the image frequency of RX1 with respect to LO12, the noise signal is convoluted by the mixer to the intermediate frequency like the received broadcast data signal. Noise having a frequency of the image frequency IM is output by the mixer 30 superposing the data signal on RX1 which is also down-converted to the intermediate frequency IF. Accordingly, it is very important to suppress any noise signal comprising a frequency at the image frequency IM. In practice, it is important that there is at least a 10 dB level difference between the received data carrying information signal received on RX1 and the unwanted disturbing noise signal having a frequency at the image frequency IM, i.e. 1735 MHz in the shown example.

Figure 8:
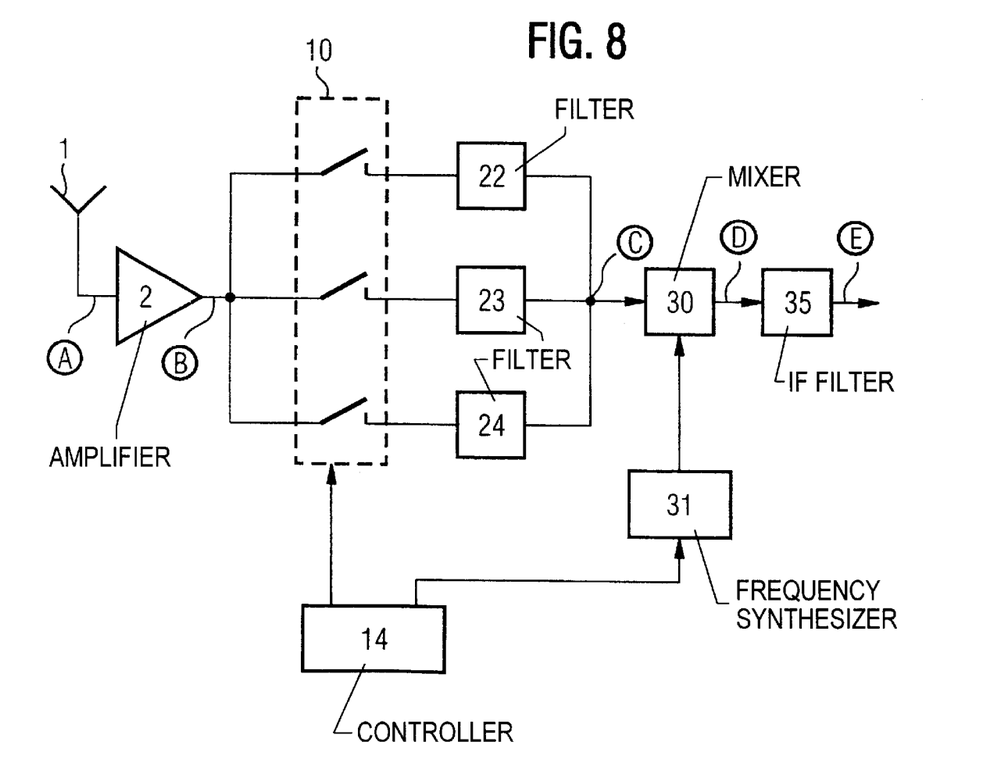
FIG. 8 shows the first embodiment of the present invention as illustrated in FIG. 2 for illustrating the signal levels at different measuring points A to E.
Figure 9:
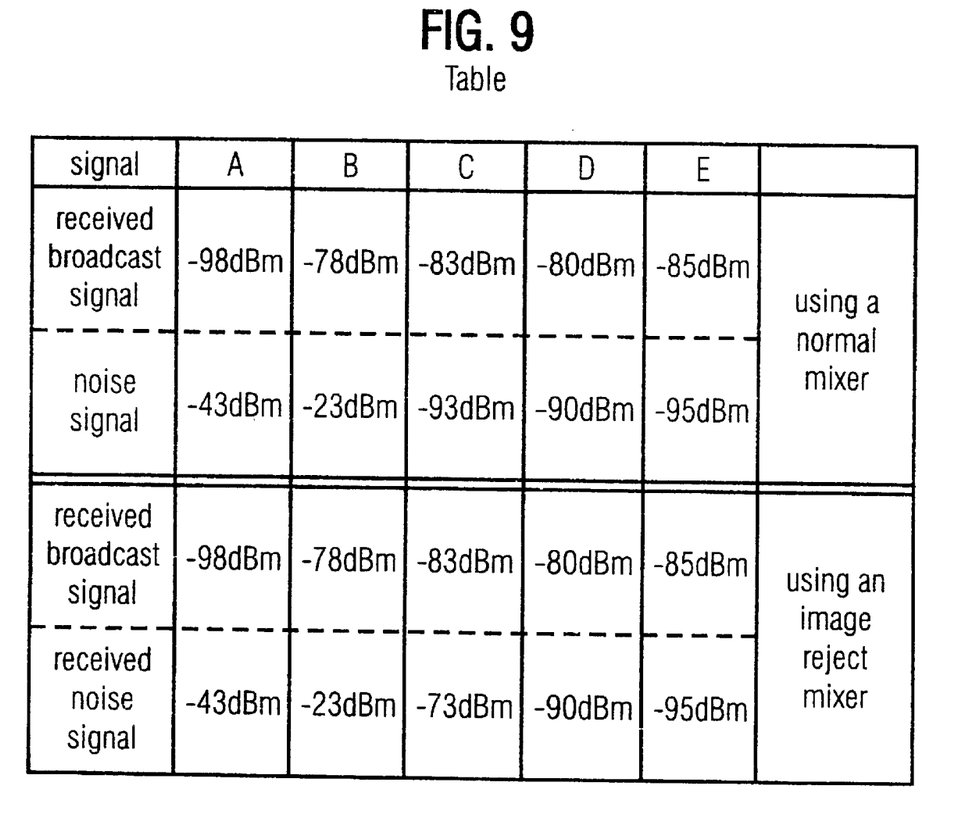
FIG. 9 shows an example of signal levels at the measuring points A to E in FIG. 8 in comparison with an embodiment using a normal mixer and using an image reject mixer.

FIG. 8 shows the first embodiment of the wide band receiver front end for a multiband receiver according to the present invention as shown in FIG. 2 with different measuring points A to E, the signal levels of which are shown in the table of FIG. 9.

As can be seen from FIG. 9, the received broadcast signal received by the antenna 1 has e.g. a level of −98 dBm, while the noise signal is much stronger having a level of 43 dBm. In case that a normal mixer 30 is used, the suppression of the noise signal at the image frequency IM is mainly achieved by the filters. In the shown example, the received broadcast signal is amplified by the wide band low noise amplifier 2 having a gain of 20 dB to a level of −78 dBm. In the bandpass frequency range, the received broadcast signal is attenuated by one of the filters 22, 23, 24 to −83 dBm and by the normal mixer 30 to −80 dBm at measuring point D. A further attenuation is performed by the IF-filter 35 to −85 dBm. In contrast, the much stronger received noise signal having a level of −43 dBm is also amplified by the low noise amplifier 2 to −23 dBm, but attenuated by −80 dB to a level of −93 dBm at measuring point C, lifted to −90 dBm at measuring point D and atenuated to −95 dBm at measuring point E. In such a manner, using a normal mixer 30, the necessary level difference of 10 dB is mainly achieved by the strong suppression by means of filtering devices 22, 23, 24.

As can be seen in the lower part of the table shown in FIG. 9, in case that an image reject mixer is used instead of a normal mixer, the necessary attenuation performed by the filters is lower. The received broadcast signal having a level of −98 dBm is amplified to −78 dBm and attenuated slightly in the bandpass frequency band to −83 dBm at point C and lifted up by the image reject mixer 30 to −80 dBm, while attenuated by the IF-filter 35 to −85 dBm. The unwanted received noise signal at the image frequency IM having −43 dBm at the antenna is amplified to −23 dBm by the low noise amplifier 2 and attenuated by the filtering means to −73 dBm at measuring point C. By means of the image reject mixer 30, the noise signal is further attenuated to −90 dBm at measuring point D and finally by the IF filter 35 to −95 dBm.

As can be seen from FIG. 9 by using the image reject mixer, also the necessary level difference of 10 dB is achieved. The advantage of using the image reject mixer instead of the normal mixer resides in that the requirements for the filtering means 22, 23, 24 are much lower. While in case that a normal mixer is used, the filtering means have to achieve a suppression or attenuation of the unwanted noise signal of 80 dB, the employment of an image reject mixer requires only an attenuation by means of filtering means of 50 dB. Accordingly, by using an image reject mixer, the bandpass filter 22, 23, 24 can be of a much simpler structure reducing production cost and lowering the complexity of the mobile phone.

Figure 10:
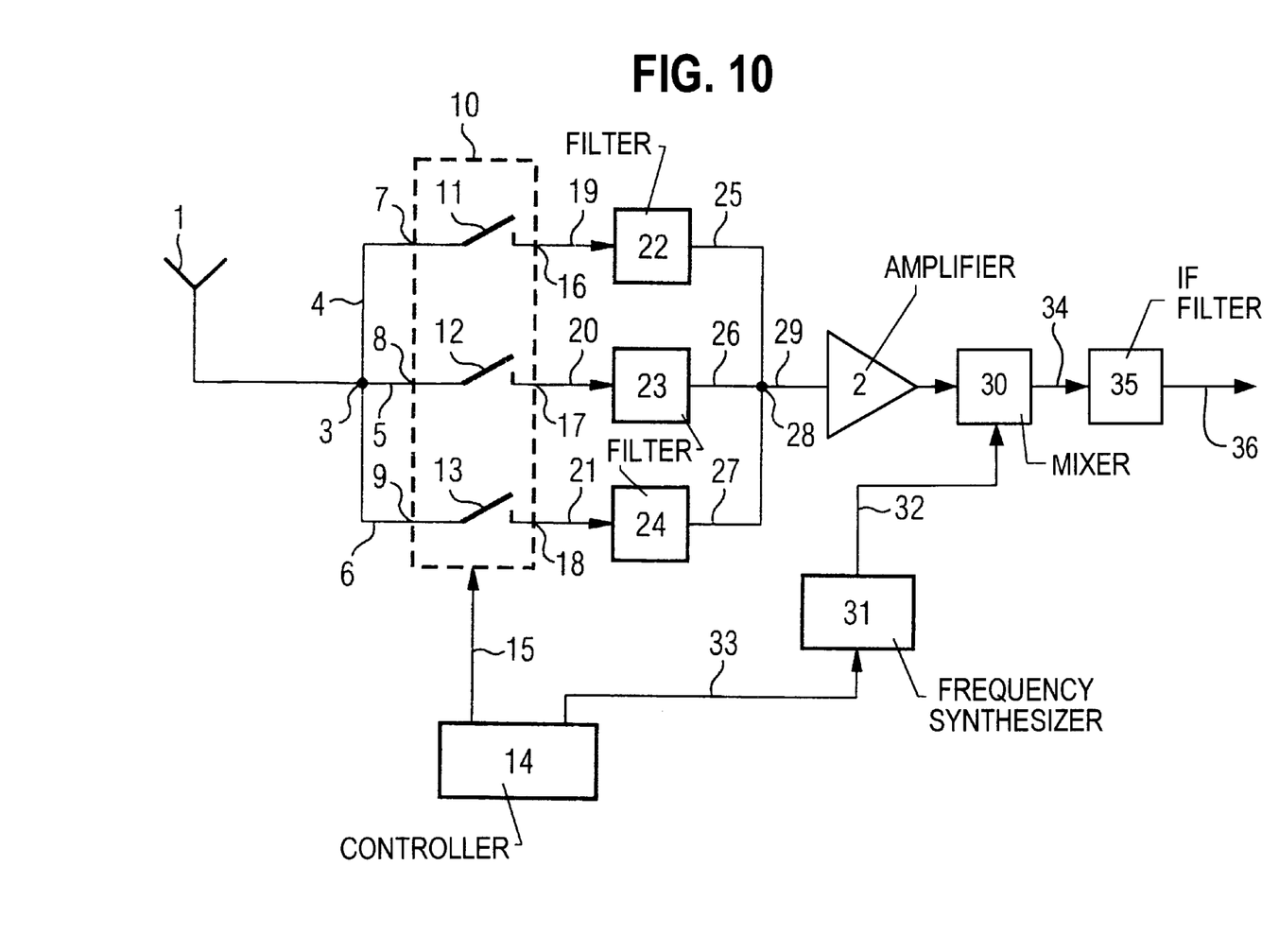
FIG. 10 is a block diagram of an additional embodiment of a switchable wide band receive front end according to the invention, in which the amplifier follows the switching means and the bandpass filters.

An additional embodiment of the switchable receiver front end according to the invention is shown in FIG. 10. This embodiment is the same as the embodiment in FIG. 2, except that the amplifier 2 follows the switching means 10 and the bandpass filters 22, 23, 24. The amplifier 2 is arranged between the mixer 30 and the node 28, which immediately follows the bandpass filters 22, 23, 24.

Figure 11:
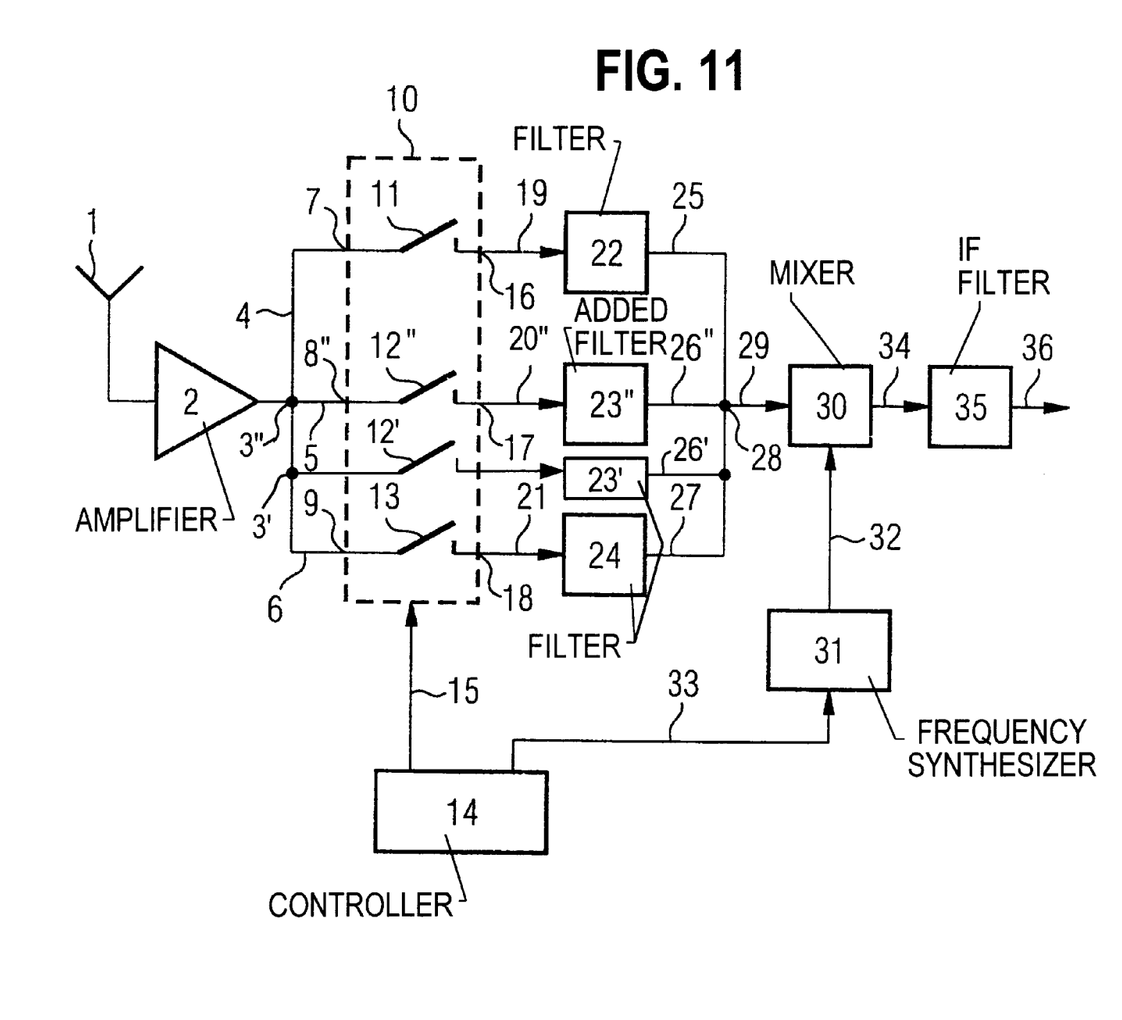
FIG. 11 is a block diagram of a further embodiment of a switchable wide band receiver front end according to the invention, with additional bandpass filters for further frequency bands.

A further embodiment of the switchable receiver front end according to the invention is shown in FIG. 11. This embodiment is the same as the embodiment shown in FIG. 2, except that one of the circuit branches consisting of switch 12 connected in series with bandpass filter 23 is replaced by two circuit branches, each consisting of switch 12' or 12" connected in series with bandpass filter 23' or 23". In this embodiment the GSM 1800 band for example can be split into two bands, a band from 1805 to 1845 and a band from 1845 to 1880, as previously explained.

Although the present invention has been described with respect to preferred embodiments thereof, it should be understood that many modifications can be performed without departing from the scope of the invention as defined by the appended claims.

We claim:

1. A switchable wide band receiver front end device for a multiband receiver, said front end device including
    an antenna (1) for receiving broadcast signals within a plurality of receiving frequency bands, wherein each of the receiving frequency bands is divided into a plurality of channels;
    one and only one wideband low noise amplifier (2) connected to said antenna (1) to amplify the broadcast signals received in any of the receiving frequency bands and for outputting amplified output signals;
    switching means (10) comprising a number of switches (11, 12, 13) connected in parallel with each other and with said low-noise amplifier (2) to receive said amplified output signals, wherein the number of said switches (11, 12, 13) corresponds to a total number of said receiving frequency bands;
    plural bandpass filters (22, 23, 24) each connected in series to a respective one of said switches (11, 12, 13), wherein each of said bandpass filters has a bandpass filtering characteristic designed to pass signals received in an associated one of said receiving frequency bands;
    one and only one mixer (30) connected to an output side of each of said bandpass filters, said mixer (30) comprising means for mixing filtered signals output from said bandpass filters (22, 23, 24) with a locally generated mixing signal to produce intermediate frequency signals;
    a controllable frequency synthesizer (31) for generating said locally generated mixing signal, said frequency synthesizer being connected with said mixer (30) to supply said mixer with said locally generated mixing signal; and
    a control unit (14) comprising means for generating a first control signal to switch said independently controllable switches (11, 12, 13) so that only said filtered signals from a selected one of said receiving frequency bands are input to said mixer (30) and means for generating a second control signal for said frequency synthesizer (31), whereby said frequency synthesizer generates said locally generated mixing signal at a local oscillation frequency according to said selected one of said receiving frequency bands.

2. The wide band receiver front end device as defined in claim 1, wherein said mixer (30) is an image reject mixer.

3. The wide band receiver front end device as defined in claim 2, wherein said image reject mixer has an input side and an output side and comprises a first signal branch on said input side, a second signal branch on said input side, a first phase shifting means (48) and an adder (58) on said output side, said first signal branch including a first mixing device (50) and a second phase shifting means (55) connected with the first mixing device (50) and said second signal branch including a second mixing device (51) and a third phase shifting device (62) connected with the second mixing device (51); whereby the filtered signals input to said image reject mixer are branched to said first and second signal branches, the locally generated mixing signal is phase shifted by the first phase shifting means (48) to generate a phase-shifted locally generated mixing signal, the filtered signals are mixed by said first mixing device (50) in said first signal branch with said phase-shifted locally generated mixing signal to produce a first mixing product signal, the first mixing product signal is phase shifted by the second phase shifting means (55) to form a phase-shifted first mixing product signal, the filtered signals are mixed in the second signal branch with said locally generated mixing signal to produce a second mixing product signal, the second mixing product signal is phase shifted by the third phase shifting means (62) to form a phase-shifted second mixing product signal and said phase-shifted second mixing product signal is added in said adder (58) to said phase-shifted first mixing product signal to produce said intermediate frequency signals.

4. The wide band receiver front end device as defined in claim 3, wherein the first phase shifting means (48) performs a phase shift of 90° and said second and third phase shifting means (55, 62) each perform a phase shift of 0° or 90°.

5. The wide band receiver front end device as defined in claim 2, wherein the intermediate frequency signals output by said mixer (30) have a frequency of about 400 MHz.

6. The wide band receiver front end device as defined in claim 2, further comprising means for suppressing signal noise components at an image frequency (IM) of the mixer (30).

7. The wide band receiver front end device as defined in claim 1, further comprising an IF filter (35) connected to an output side of the mixer (30) and wherein said IF filter (35) has a frequency bandpass centered around a predetermined intermediate frequency.

8. The wide band receiver front end device as defined in claim 7, wherein said frequency bandpass of said IF filter (35) is 200 kHz corresponding to a frequency width of a physical GSM data channel.

9. The wide band receiver front and device as defined in claim 1, further comprising an additional switching means (37) for inhibiting interactions between the bandpass filters (22, 23, 24), said additional switching means including additional switches (38, 39, 40), and wherein each of said additional switches (38, 39, 40) is connected to an output side of each of said bandpass filters (22, 23, 24) and to an input side of said mixer (30).

10. The wide band receiver front end device as defined in claim 1, wherein said switching means (10) is a high power antenna microwave monolithic integrated circuit (MMIC) having receiving ports and a switch speed of about 100 ns.

11. The wide band receiver front end device as defined in claim 1, wherein said receiving frequency bands are downlink frequency bands of a GSM telecommunications system.

12. The wide band receiver front end device as defined in claim 11, wherein said downlink frequency bands include GSM 900, GSM 1800 and GSM 1900.

13. The wide band receiver front end device as defined in claim 11, wherein frequency variations of said locally generated mixing signal (LO) for respective different GSM modes are minimized.

14. The wide band receiver front end device as defined in claim 1, wherein said control unit (14) automatically detects the one of the receiving frequency bands in which data is broadcast from a transmitting base station and generates said first control signal so that said one of said frequency bands in which said data is broadcast is selected.

15. The wide band receiver front end device as defined in claim 1, wherein said bandpass filters (22, 23, 24) are surface acoustic wave filters, dielectric filters, helical filters, multilayer filters, stripline filters or microstrip filters.

16. The wide band receiver front end device as defined in claim 1, further comprising additional narrow-band filters for filtering one or more of the receiving frequency bands, whereby two of said additional narrow-band filters cover GSM 1800, a first of said two covering a first band portion from 1805 to 1845 MHz and a second of said two covering a second band portion from 1845 to 1880 MHz.

* * * * *